United States Patent [19]

Bernard et al.

[11] 4,083,785
[45] Apr. 11, 1978

[54] BIOLOGICAL TREATMENT PLANT FOR LIQUID SUSPENSIONS

[75] Inventors: Jacques Bernard, St. Germain en Laye; Michel Renaudin, Beynes, both of France

[73] Assignee: Degremont, Societe Generale D'Epuration et D'Assainissement, Rueil Malmaison, France

[21] Appl. No.: 463,411

[22] Filed: Apr. 23, 1974

[30] Foreign Application Priority Data

Jul. 5, 1973   France ............................... 73.24722

[51] Int. Cl.² ............................................... C02C 1/10
[52] U.S. Cl. .............................. 210/195 S; 210/197; 210/219; 210/220
[58] Field of Search ........................................ 210/3–9, 210/14, 15, 63, 195–197, 199, 218, 219, 220, 221

[56] References Cited

U.S. PATENT DOCUMENTS

| 3,133,017 | 5/1964 | Lambeth | 210/5 |
|---|---|---|---|
| 3,507,393 | 4/1970 | Weis et al. | 210/195 |
| 3,547,811 | 12/1970 | McWhirter | 210/15 X |
| 3,547,814 | 12/1970 | McWhirter | 210/6 X |
| 3,547,815 | 12/1970 | McWhirter | 210/15 X |
| 3,764,524 | 10/1973 | Stankewich, Jr. | 210/15 X |

*Primary Examiner*—Charles N. Hart
*Assistant Examiner*—Robert H. Spitzer
*Attorney, Agent, or Firm*—Wenderoth, Lind & Ponack

[57] ABSTRACT

A plant for the biological processing by means of activated sludge, by oxidation with pure oxygen or oxygen-enriched air, followed by a settling step, of a liquid suspension containing oxidizable matters, includes, in addition to the settling tank, a plurality of oxidation tanks disposed in series, communicating with each other, and adapted to be supplied with oxygen or oxygen-enriched air and the suspension to be treated, while recycling the decanted sludge, the suspension to be treated flowing in the direction of from the upstream tank to the downstream tank. The oxygen or oxygen-enriched air is introduced into the downstream tank and the venting of the plant to the atmosphere takes place from the upstream tank, whereby the venting of the plant to the atmosphere is responsive to the oxygen content of the gaseous phase in the upstream tank where the oxygen demand and therefore the oxygen concentration have their highest values, and the flow of oxygen or oxygen enriched air from the downstream tank wherein the demand for this gas and the consumption thereof are appreciably lower, cause an immediate and continuous increment in the oxygen content of the gaseous phase in the upstream tank, thus ensuring a rapid response to any oxygen demand together with a regular and continuous oxygen supply to the plant.

10 Claims, 6 Drawing Figures

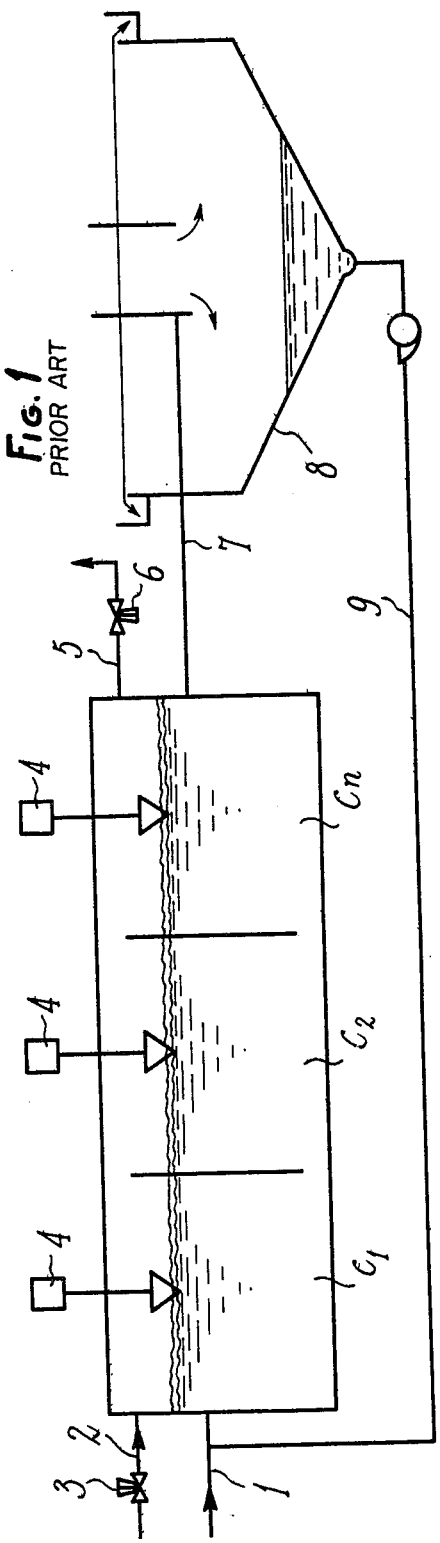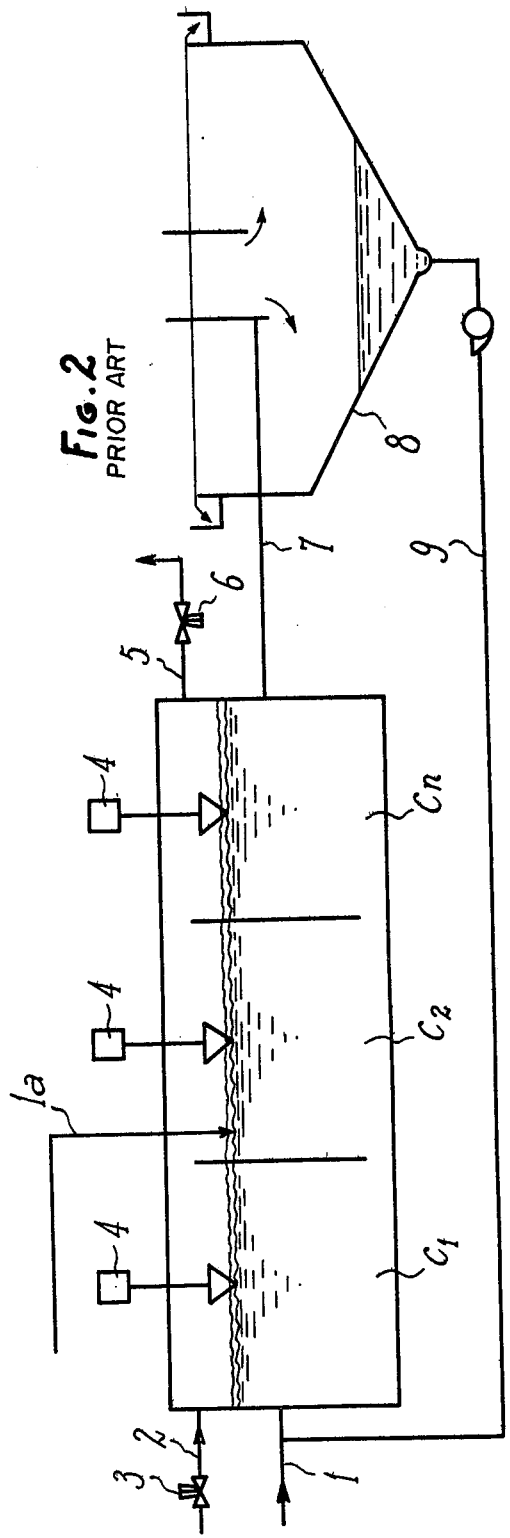
Fig. 1 PRIOR ART
Fig. 2 PRIOR ART

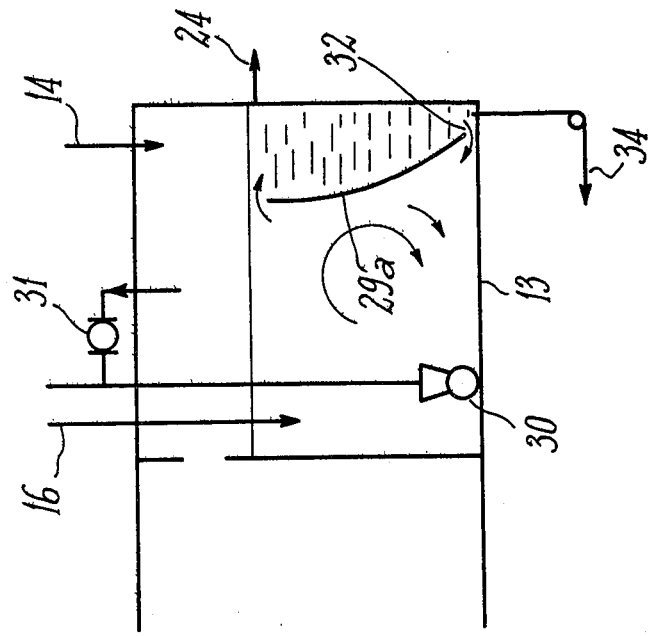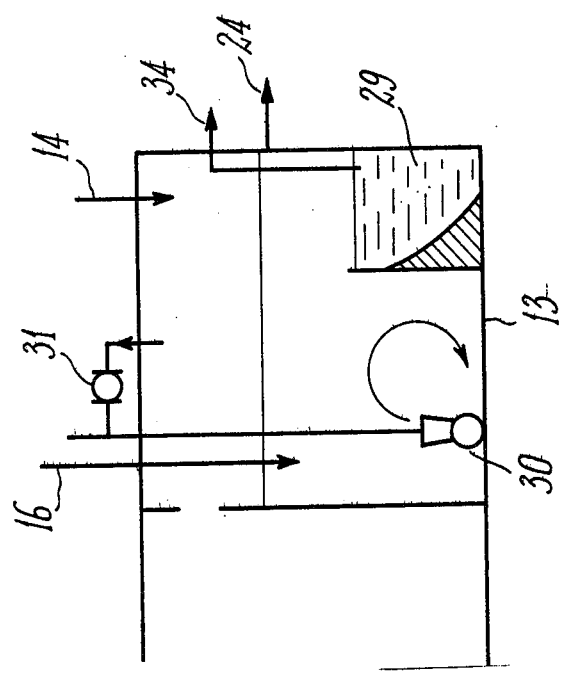

BIOLOGICAL TREATMENT PLANT FOR LIQUID SUSPENSIONS

BACKGROUND OF THE INVENTION

The present invention relates the means for the biological treatment of liquid suspensions containing oxidizable matters, and has specific reference to a plant for performing this treatment intended more particularly but not exclusively for the purification of waste water, to the biological treatment of industrial processing water and to the treatment of fermentation liquors.

For many decennaries the conventional source of oxygen for such biological treatment processes was atmospheric air. However, it is now well known, for example in the treatment of waste water by the so-called activated-sludge method, to use as an oxidizing agent a gas carrying oxygen under a partial pressure higher than the atmospheric value, which is also referred to as oxygen-enriched air or pure oxygen, so that, by simply increasing the oxygen partial pressure of the injected gas, relatively high oxygenation capacities, for instance higher than 500 grams per hour of oxygen per cubic meter of tank capacity, can be attained, while utilizing relatively low gas outputs. In many cases to minimize losses of this high-oxygen gas and achieve the best possible diffusion efficiency, the liquid mass to be enriched with oxygen is contained in an enclosed, covered space.

Thus, it is possible under these conditions and in the specific case of the activated-sludge process to maintain a high microorganism concentration in the biological reactor, and to cause the waste water to be purified, the substratum to be oxidized and to contact the highly concentrated activated sludge of which the oxygen demand is considerably greater than that of activated sludge developed in a treatment plant utilizing only atmospheric air. Therefore, the organic matter is oxidized and degraded more rapidly and the necessary contact times are shorter.

However, up to now, two technological difficulties reduced considerably the practical and economical advantage resulting from the use of pure oxygen, notably in waste water biological treatment plants:

a. The biological flock problem. After contacting the oxygenated bacteria, the biological flock must be removed from the then purified water. As a rule, this separation takes place by settling or decantation. Now, decanting a more concentrated liquor requires more time and slower upward flow rates, so that the reduction in the volume of the biological reactor which is afforded by the use of oxygen can be at least partially compensated by increasing the dimensions of the decanter of settling tank. Obviously, the use of an oxygen-enriched gas improves somewhat the physical properties of the sludge (settling propensity) in comparison with the conventional process utilizing atmospheric air, but in most instances this gain is not sufficient.

In either case, this inconvenience is compensated by substituting floating for settling, but this palliative is not applicable under all circumstances and in addition it implies a higher power consumption.

b. The other inconvenience is found in the difficulty of properly regulating or metering the supply of oxygen or oxygen-enriched air to the plant.

In its conventional principle this plant comprises a plurality of oxidation compartments such as open tanks disposed in series.

The liquid to be treated is fed to the upstream tank via a duct, and oxygen is supplied thereto via another duct equipped with automatic valve means actuated by a pressure outlet provided in the gaseous sheet so that the valve opens when the pressure in the tank drops below a predetermined minimum value. These tanks communicate with each other through openings formed in their mutual partitions and comprise means for aerating the liquor. Opening into the downstream tank, above the level attained by the liquor, is a pipe having inserted along its path an automatic valve adapted to close when the oxygen content of the gaseous phase of the downstream compartment drops below the predetermined limit value.

The treated liquid is discharged from the downstream compartment via a pipe into a settling tank. The settled sludge is recycled to the upstream tank via another pipe line which in this example is branched off the duct supplying the liquid to be treated.

In these known plants the oxygen stream flows from the upstream tank to the downstream tank in the same direction as the liquid to be purified and the sludge recycled for a subsequent reactivation.

However, this arrangement is objectionable in that since the oxygen demand and therefore the oxygen consumption decreases from the upstream tank to the downstream tank, when the partial oxygen pressure in the gaseous phase of the downstream tank attains the minimum threshold or alarm value and the valve for venting the tank to the atmosphere opens, the partial oxygen pressures in the gaseous phases of the upstream compartments are also low and must be renewed. Under these conditions it is clear that the supply of oxygen through the upstream compartment valve is extremely irregular.

SUMMARY OF THE INVENTION

It is the primary object of the present invention to avoid these two inconveniences. To this end, the present invention provides an improved plant arrangement for carrying out a biological process of the type set forth hereinabove, which affords a more regular supply of oxygen to the various compartments or tanks of the plant, thus ensuring a better continuity in the oxygen contents of the liquor contained in the enclosures, whereby a more regular operation of the plant in general is obtained, while reducing the oxygen consumption and finally improving considerably the power balance.

According to this invention, and more particularly to one of its essential features, the oxygen or oxygen-enriched air is caused to circulate through the oxidation tank or compartment in counter-current relationship to the liquor and recycled sludge, the oxygen being fed to the downstream tank while the venting to the atmosphere takes place in the upstream tank, whereby this venting is directly subordinate to the oxygen content of the gaseous phase of the upstream tank where the oxygen demand and therefore the consumation of this valuable gas assume their highest values.

The flow of oxygen-enriched air from the downstream tank, where the demand and consumption are lower, is attended by an immediate and continuous increment or increase in the oxygen content of the gaseous phase of the upstream tank. With the arangement according to this invention it is thus possible to obtain a rapid response to any oxygen demand, as well as a regular and continuous oxygen supply throughout the plant.

Also according to this invention and to another essential feature the same, the liquid suspension to be purified is caused to undergo a partial settling preliminary to that completed in the settling tank, the concentrated biological sludge obtained during such preliminary settling step being returned to the head of the plant, advantageously with the sludge from the settling tank, in order to recycle the sludge in the biological treatment process applied to the liquid suspension to be purified.

This specific feature of the present invention is attended by a twofold advantage:

On the first hand, it makes it possible to reduce appreciably the over-all dimensions of the settling tank; on the other hand, it further increases the quickness of response of the system described hereinabove.

BRIEF DESCRIPTION OF THE DRAWINGS

The various features and advantages of the present invention will appear more clearly as the following description proceeds with reference to the attached drawings showing a few typical embodiments thereof. However, stress is laid on the fact that these embodiments should not be construed as limiting the scope of the invention since various changes and variations may be brought thereto without departing from the basic principles of the invention.

FIGS. 1 and 2 are schematic views of prior art biological treatment plants;

FIGS. 4 and 5 are schematic views of modifications of one portion of the plant of FIG. 3.

DETAILED DESCRIPTION OF THE INVENTION

Figure 3:
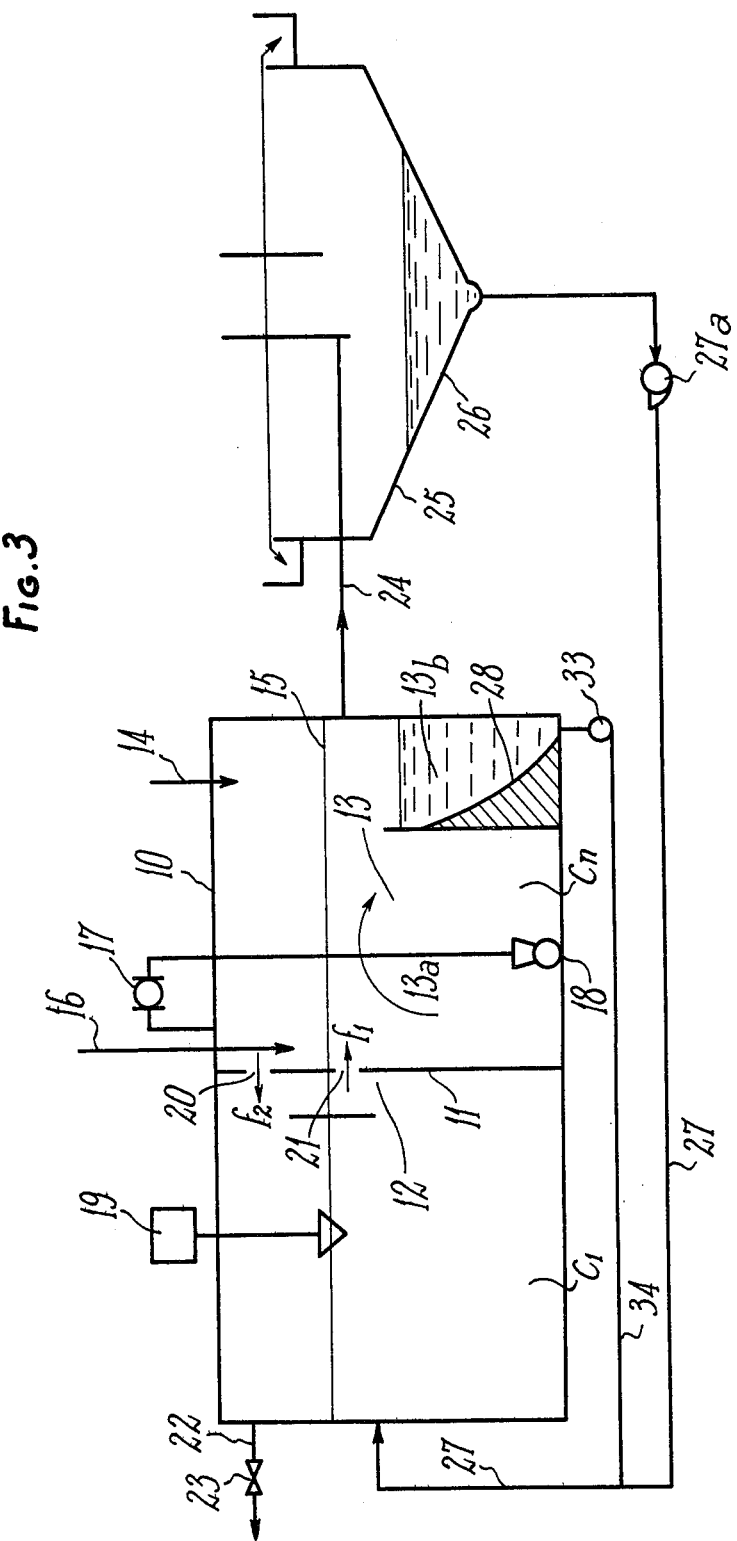
FIG. 3 is a schematic view of a first embodiment of a biological treatment plant in accordance with the present invention.

With reference now to FIGS. 1 and 2 of the drawings, a conventional biological treatment plant will be described.

In its conventional principle this plant comprises a plurality of oxidation compartments such as tanks $C_1$, $C_2 \ldots C_n$ disposed in series.

The liquid to be treated is fed to the upstream tank $C_1$ via a duct 1, and oxygen is supplied thereto via another duct 2 equipped with automatic valve means 3 actuated by a pressure outlet (not shown) provided in the gaseous sheet of tank $C_1$ so that the valve 3 opens when the pressure in tank $C_1$ drops below a predetermined minimum value. These tanks $C_1$, $C_2$, and $C_n$ communicate with each other through openings formed in their mutual partitions and comprise means 4 for aerating the liquor. Opening into the downstream tank $C_n$, above the level attained by the liquor, is a pipe 5 having inserted along its path an automatic valve 6 adapted to close when the oxygen content of the gaseous phase of the downstream compartment $C_n$ drops below the predetermined limit value.

The treated liquid is discharged from the downstream compartment $C_n$ via a pipe 7 into a settling tank 8. The settled sludge is recycled to the upstream tank $C_1$ via another pipe line 9 which in this example is branched off the duct supplying the liquid to be treated. The plant illustrated in FIG. 2 differs from that of FIG. 1 only in that the water to be purified is fed via a duct 1a opening into the intermediate tank $C_2$ adjacent tank $C_1$.

In these known plants the oxygen stream flows from the upstream tank to the downstream tank in the same direction as the liquid to be purified and the sludge recycled for a subsequent reactivation.

However, this arrangement is objectionable in that since the oxygen demand and therefore the oxygen consumption decreases from the upstream tank to the downstream tank, when the partial oxygen pressure in the gaseous phase of the downstream tank $C_n$ attains the minimum threshold or alarm value and the valve 6 for venting the tank to the atmosphere opens, the partial oxygen pressures in the gaseous phases of compartments $C_1 \ldots C_2$ are also low and must be renewed. Under these conditions it is clear that the supply of oxygen through valve 3 is extremely irregular.

In the embodiment illustrated diagrammatically in section in FIG. 3 the plant comprises a tank 10, divided by an inner partition 11 into two compartments; i.e. an upstream compartment 12 for reactivating the sludge and a downstream compartment 13 for contact purposes, the terms "upstream" and "downstream" denoting the relationship between these tank compartments and the direction of flow of the liquid suspension to be treated in the tank.

The oxygen or oxygen-enriched air is fed to the downstream compartment 13 via a pipe line 14 opening above the level, shown diagrammatically at 15, attained by the liquid in the tank. This liquid suspension is also fed to the downstream compartment via a pipe line 16.

The gaseous sheet disposed above the water level is sucked by a pump 17 and forced through a diffuser 18 disposed at the bottom of compartment 13 in the area 13a thereof, which is intended for a purpose to be explained presently. Besides, the upstream compartment 12 is equipped with stirring and feed means adapted to suck in the gaseous sheet and to diffuse the same through the sludge. These means may comprise for example a vertical-axis turbine shown diagrammatically at 19. Immersed diffusers fed from compressors, blowers, fans or equivalent means may also be used to this end.

The inner partition 11 of tank 10 is discontinued by openings 20, 21 to permit a fluid circulation between compartments 12 and 13, this circulation consisting of the gaseous sheet (opening 20) and liquor (opening 21) containing the activated sludge. According to this invention, the tank 10 communicates with the external atmosphere through the upstream compartment 12 due to the provision of a pipe line 22 equipped with a valve 23 connected to a pressure intake (not shown) located in the gaseous sheet of compartment 12.

The tank 10 is connected at compartment 13 by means of a duct 24 to a settling tank 25 from which the sludge is returned via a duct 27 and a pump 27a to the upstream compartment 12.

On the other hand and according to this invention the downstream compartment 13 comprises two sections, i.e. a first section 13a in which the gaseous sheet is caused to contact and stir the suspension to be processed, this section comprising the diffuser 18, and a second section 13b in which the preliminary settling of the biological sludge takes place, due to the provision of a concentrator 28 in which a substantial fraction of the biological sludge is deposited.

FIGS. 4 and 5 illustrate two modified embodiment of compartment 13. In the first case (FIG. 4) a series of concentrators or hoppers 29 are arranged on one side of compartment 13, and in the other portion of this compartment a row of diffusers 30 disposed on the bottom are supplied with supercharged gas from a supercharger 31 adapted to recycle by itself the gaseous mixture overlying the liquid level. This gas injection causes the sludge to be stirred and assume a state of suspension, the sludge settling naturally in the hoppers, i.e. in calm areas propitious to the settling and concentration of the solid particles in the suspension.

In the second case illustrated in FIG. 5 the above-mentioned concentration can be obtained in a compartment having a vertical, cross-sectional, area decreasing gradually from top to bottom and comprising at its bottom a continuous slot 32 of relatively small width, due to a specific shape and arrangement of the walls 29a of the concentrators and to diffusers 30. Due to the low natural recycling output produced through this slot 32 the concentrated sludge can possibly be returned to the stirring roll induced by the pumping effect produced by diffusers 30.

Under these conditions, it is possible to reduce from 30 percent to 50 percent the concentration of solid particles in suspension in the liquor fed into compartment 13, before directing this suspension to the settling tank.

The sludge previously decanted in compartment 13 is forced by a pump 33 and a pipe line 34 into duct 27 returning the decanted sludge from section 13b to compartment 12 in which the complete sludge stream is reactivated, where-after the sludge flows through opening 21 into the downstream compartment 13 (as shown by the arrow $f_1$).

Within the gaseous phase prevailing in the tank above the water level a flow is created as a consequence of the venting to the atmosphere of the upstream compartment 12 (as shown by the arrow $f_2$), in counter-current relationship to the direction of flow of the sludge in the processing tank.

In upstream compartment 12, due to the relatively high sludge concentration in this area, the oxygen demand is the highest in the system, in contrast to the conditions prevailing in the highly oxidized downstream compartment content where the oxygen demand is considerably lower, due to the preliminary reactivation in the upstream compartment of the biological sludge.

Now as already explained in the foregoing, the upstream compartment 12 is vented to the atmosphere via a valve 23 adapted to close automatically when the oxygen content of the gaseous phase in this compartment drops below a predetermined limit value. However, an oxygen flow from the downstream compartment will cause this valve to open rapidly. Due to the provisions of this invention a considerably more sensitive regulation and a considerably smaller variation in the output of oxygen delivered to the plant are obtained in comparison with the prior art systems mentioned in the foregoing.

If a momentary want of oxygen occurred in compartment 12, the only consequence thereof would be a higher sludge reactivation, without any detrimental effect on the quality of the treated liquid.

Figure 6:
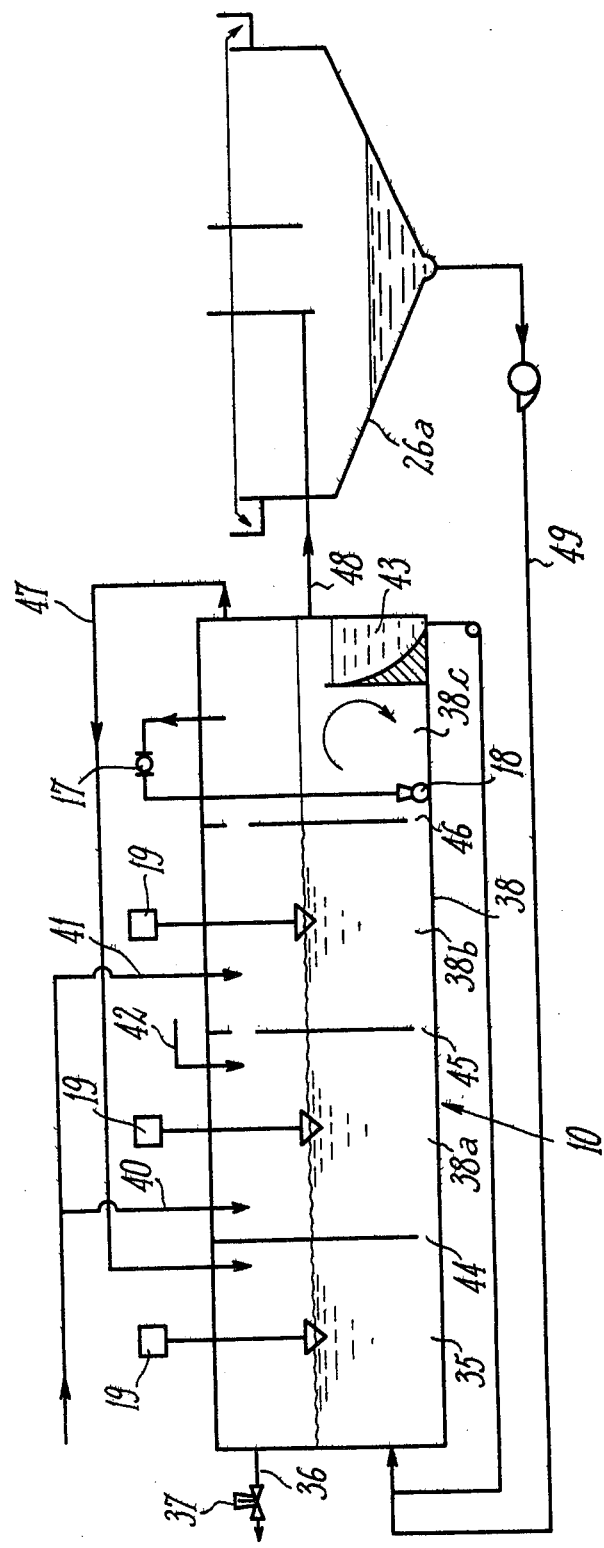
FIG. 6 is a schematic view of a second embodiment of a biological treatment plant in accordance with the present invention.

FIG. 6 illustrates a typical embodiment of a plant according to this invention, wherein the tank 10 comprises: an upstream reactivation compartment or tank 35 adapted to be vented to the atmosphere via a valve 37 connected to a pressure outlet provided within the gaseous phase of compartment 35 equipped with stirring means 19 similar to those equipping the upstream compartment 12 of the embodiment illustrated in FIG. 3 and a downstream contact tank 38 comprising a series of successive or series-connected compartments 38a, 38b, 38c. A pair of branch lines 40 and 41 open respectively into compartments 38a and 38b for supplying thereto the suspension to be processed. Compartment 38a is supplied with oxygen or oxygen-enriched air via another pipe line 42. These two compartments are also provided with stirring means 19. The last compartment 38c of the downstream tank is divided into two sections, one for stirring the suspension and the other for effecting the preliminary settling of sludge by means of a concentrator 43. This compartment 38c is equipped with a diffuser 18 fed from a supercharger 17 with gas taken from the gaseous phase prevailing in the tank.

The various compartments constituting the downward or contact tank 38 communicate with each other by their liquid phase through siphonal partitions 45 and 46, and compartment 38a communicates with reactivation compartment 35, by their liquid phases, through siphonal partition 44.

At the level of the gaseous phase compartments 38a, 38b and 38c communicate with each other via apertures formed in the upper portion of partitions 45 and 46. The gaseous phase in compartment 38c of tank 38 is connected via the external pipe line 47 to the upstream tank 35.

The sludge presettled in compartment 38c of downstream tank 38 is recycled via pipe line 49 leading to the upstream tank together with the sludge from decanter 26a connected to the downstream tank via pipe line 48.

The operation of this plant is similar to that of the plant described with reference to FIG. 3, as far as the presettling of sludge and the regulation of the supply of oxygen or oxygen-enriched air, this gas being introduced into the downstream or contact 38, the gas being vented to the atmosphere from the upstream reactivation tank 35.

With this plant the polluting matter can be distributed, whereby the work accomplished by the bacterial flora is made more uniform while avoiding the use of an abnormally great number of stirring and dissolving means in the upstream tank.

A typical example of the distribution of concentrations through the system is given in the following Table:

| Upstream tank | Intermediate tank | Downstream tank | Outlet to settling tank |
| --- | --- | --- | --- |
| 12 Grams/lit. | 8 Gram/lit. | 6 gram/lit. | 4 Gram/lit. |

A gain varying from 30 percent to 50 percent on the concentration of the feed liquor supplied to the settling tank entails a reduction of the same order of magnitude in the floor area and volume of this plant.

Of course, the number of compartments in the downstream contact tank is immaterial and/or may be determined as a function of the specific requirements for each particular application.

Besides, as already mentioned in the foregoing, various modifications and changes may be made to the particular examples given herein without departing from the basic principles of the invention as set forth in the appended claims.

What is claimed is:

1. In a plant for the biological treatment by means of activated sludge, by oxidation with pure oxygen or oxygen-enriched air, of a liquid suspension containing oxidizable material, said plant being of the type wherein a liquid suspension progressively flows from an upstream direction to a downstream direction while progressively having oxidizable material removed therefrom, the improvement wherein said plant comprises:

an upstream first tank containing therein activated sludge and having a gas space above said activated sludge, said upstream first tank comprising reactivated sludge supply means;

a downstream second tank having therein at least one compartment;

means for introducing a liquid suspension to be treated into said downstream second tank;

said downstream second tank having a gas space above said liquid suspension;

means providing communication between said upstream first tank and said downstream second tank for causing said activated sludge to flow from said upstream first tank into said downstream second tank to form a mixture with said liquid suspension and for causing said mixture to flow in a downstream direction;

means for introducing oxygen or oxygen-enriched air into said gas space in said downstream second tank for oxidation reaction with said mixture;

means for passing, from said gas space in said downstream second tank to said gas space in said upstream first tank, the oxygen or oxygen-enriched air not used by the reaction in said downstream second tank, to thereby reactivate said sludge in said upstream first tank;

means for exhausting to the atmosphere from said gas space in said upstream first tank a gaseous phase therein in response to the oxygen content of said gaseous phase;

a sludge settling tank;

means for passing said mixture, after reaction thereof with said oxygen or oxygen-enriched air, from said downstream second tank to said settling tank, for removal from said mixture to said sludge; and means for returning the thus removed sludge to said upstream tank to recycle and resupply the level of sludge in said upstream first tank.

2. The improvement claimed in claim 1, wherein said downstream second tank has therein means for partially settling sludge from said liquid suspension; and further comprising means for passing the thus partially settled sludge to said upstream first tank to further recycle and resupply the level of sludge in said upstream first tank.

3. The improvement claimed in claim 2, wherein said means for partially settling sludge comprises at least one diffuser means for creating a decantation-promoting stream within said mixture; and at least one concentrator means for concentrating decanting sludge.

4. The improvement claimed in claim 3, wherein said diffuser means comprises a supercharger for circulating the oxygen or oxygen-enriched air in said gas space in said downstream second tank through said mixture.

5. The improvement claimed in claim 3, wherein said concentrator means comprises a plurality of hoppers positioned at one side of said downstream second tank.

6. The improvement claimed in claim 3, wherein said concentrator means comprises a compartment having a variable vertical cross-section and having at the bottom thereof a continuous slot.

7. The improvement claimed in claim 1, wherein said downstream second tank has therein a plurality of series-connected compartments; and said gas space in said downstream second tank comprises a gas chamber in each of said compartments.

8. The improvement claimed in claim 7, wherein said liquid suspension introducing means enters at least the upstream-most of said plurality of compartments; and wherein said mixture flow causing means moves said mixture in said downstream direction through each of said compartments.

9. The improvement claimed in claim 8, further comprising partitions separating adjacent of said compartments, said partitions having first orifices providing series communication between said gas chambers, and second orifices providing series communication of said mixture in said downstream direction.

10. The improvement claimed in claim 7, wherein each compartment has therein means for circulating through the mixture therein the oxygen or oxygen-enriched air in the respective gas chamber.

* * * * *